(12) United States Patent
Kawai

(10) Patent No.: US 7,173,628 B1
(45) Date of Patent: *Feb. 6, 2007

(54) IMAGE INPUT APPARATUS

(75) Inventor: Hisashi Kawai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

This patent is subject to a terminal disclaimer.

(21) Appl. No.: 09/580,588

(22) Filed: May 30, 2000

Related U.S. Application Data

(62) Division of application No. 08/614,174, filed on Mar. 8, 1996, now Pat. No. 6,091,377.

(30) Foreign Application Priority Data

Mar. 13, 1995 (JP) .............................. 7-052519

(51) Int. Cl.
*G09G 5/39* (2006.01)

(52) U.S. Cl. ...................................... 345/531
(58) Field of Classification Search ...................... 345/7
See application file for complete search history.

(56) References Cited

U.S. PATENT DOCUMENTS

| | | | |
|---|---|---|---|
| 5,048,094 A | * | 9/1991 | Aoyama et al. ............. 382/151 |
| 5,220,648 A | | 6/1993 | Sato ............................ 395/146 |
| 5,247,330 A | | 9/1993 | Ohyama et al. .............. 355/64 |
| 5,367,672 A | | 11/1994 | Takagi ......................... 395/600 |
| 5,414,811 A | | 5/1995 | Parulski et al. ............. 395/162 |
| 5,455,905 A | | 10/1995 | Kaya et al. .................. 395/162 |
| 5,526,041 A | * | 6/1996 | Glatt ............................ 348/143 |
| 5,555,098 A | | 9/1996 | Parulski ...................... 358/341 |
| 5,594,501 A | | 1/1997 | Suzuki ........................ 343/373 |
| 5,642,206 A | | 6/1997 | Yamamori et al. .......... 358/471 |
| 5,796,428 A | * | 8/1998 | Matsumoto et al. ... 348/207.99 |
| 6,072,478 A | * | 6/2000 | Kurihara et al. ......... 715/500.1 |
| 6,091,377 A | * | 7/2000 | Kawai ............................ 345/7 |

FOREIGN PATENT DOCUMENTS

| | | |
|---|---|---|
| JP | 2-26339 | 1/1990 |
| JP | 2-130179 | 5/1990 |
| JP | 2-290389 | 11/1990 |
| JP | 6-237417 | 8/1994 |

\* cited by examiner

*Primary Examiner*—Kimbinh T. Nguyen
(74) *Attorney, Agent, or Firm*—Fitzpatrick, Cella, Harper & Scinto

(57) ABSTRACT

An image input apparatus is provided for picking up an image of an object placed on an original support with a camera and displaying the object image on a display device; the apparatus has a memory capable of storing a plurality of images picked up with the camera and a controller for controlling display of an image group containing a predetermined number of images stored in the memory.

9 Claims, 4 Drawing Sheets

IMAGE INPUT APPARATUS

This application is a divisional of application Ser No. 08/614,174, filed on Mar. 8, 1996 now U.S. Pat. No. 6,091,337.

BACKGROUND OF THE INVENTION

1. Field of the Invention

The present invention relates to an image input apparatus capable of picking up an image of an object such as a drawing and displaying the object image on an external display device.

2. Related Background Art

An image input apparatus is known which picks up an image of an object such as a drawing and displays the object image on an external monitor or an external screen by using a projector or the like. Such an image input apparatus is not always required to use a transparent original as in the case of an optical overhead projector (OHP), but it can use an opaque original, a document, or the like and is suitable for presentation or the like.

However, some conventional image input apparatuses have only a function of displaying a picked-up image, and do not effectively use an image once picked up.

SUMMARY OF THE INVENTION

Under the above circumstances, the present invention aims to provide an image input apparatus capable of improving versatility of the apparatus for presentation or other purposes, by effectively using an image once picked up.

In order to achieve the above object, there is provided according to one aspect of the invention an image input apparatus capable of displaying an image of an object placed on an original support and picked up by image pickup means, on a display device, comprising: storage means for storing a plurality of images picked up by the image pickup means; and control means for controlling to display a predetermined number of images among a plurality of images stored in the storage means, on the display device as an image group.

According to another aspect of the present invention, there is provided an image input apparatus capable of displaying an image of an object placed on an original support and picked up by image pickup means, on a display device, comprising: storage means for storing a plurality of images picked up by the image pickup means; control means for controlling to display a predetermined number of images among a plurality of images stored in the storage means, on the display device as an image group; supporting means for supporting the image pickup means in a first state allowing to pick up an image of an object on the original support and in a second state allowing to pick up an object at the position other than the original support; and instructing means for instructing to store an image picked up by the image pickup means in the first state of the image pickup means.

According to a further aspect of the present invention, there is provided an image input apparatus having an original support and image pickup means for picking up an image of an object placed on the original support, the image input apparatus being capable of displaying an image of an object picked up by the image pickup means, on a display device, comprising: storage means for storing a plurality of images picked up by the image pickup means; and control means for controlling to display a predetermined number of images among a plurality of images stored in the storage means, on the display device as an image group.

According to a still further embodiment of the present invention, there is provided an image input apparatus having an original support, image pickup means for picking up an image of an object placed on the original support, and a display device capable of displaying an image of an object picked up by the image pickup means, comprising: storage means for storing a plurality of images picked up by the image pickup means; and control means for controlling to display a predetermined number of images among a plurality of images stored in the storage means, on the display device as an image group.

The other objects and features of the present invention will become apparent from the following description of embodiments when read in connection with the accompanying drawings.

DETAILED DESCRIPTION OF THE PREFERRED EMBODIMENT

An embodiment of an image input system of this invention will be described with reference to the accompanying drawings.

Figure 1:
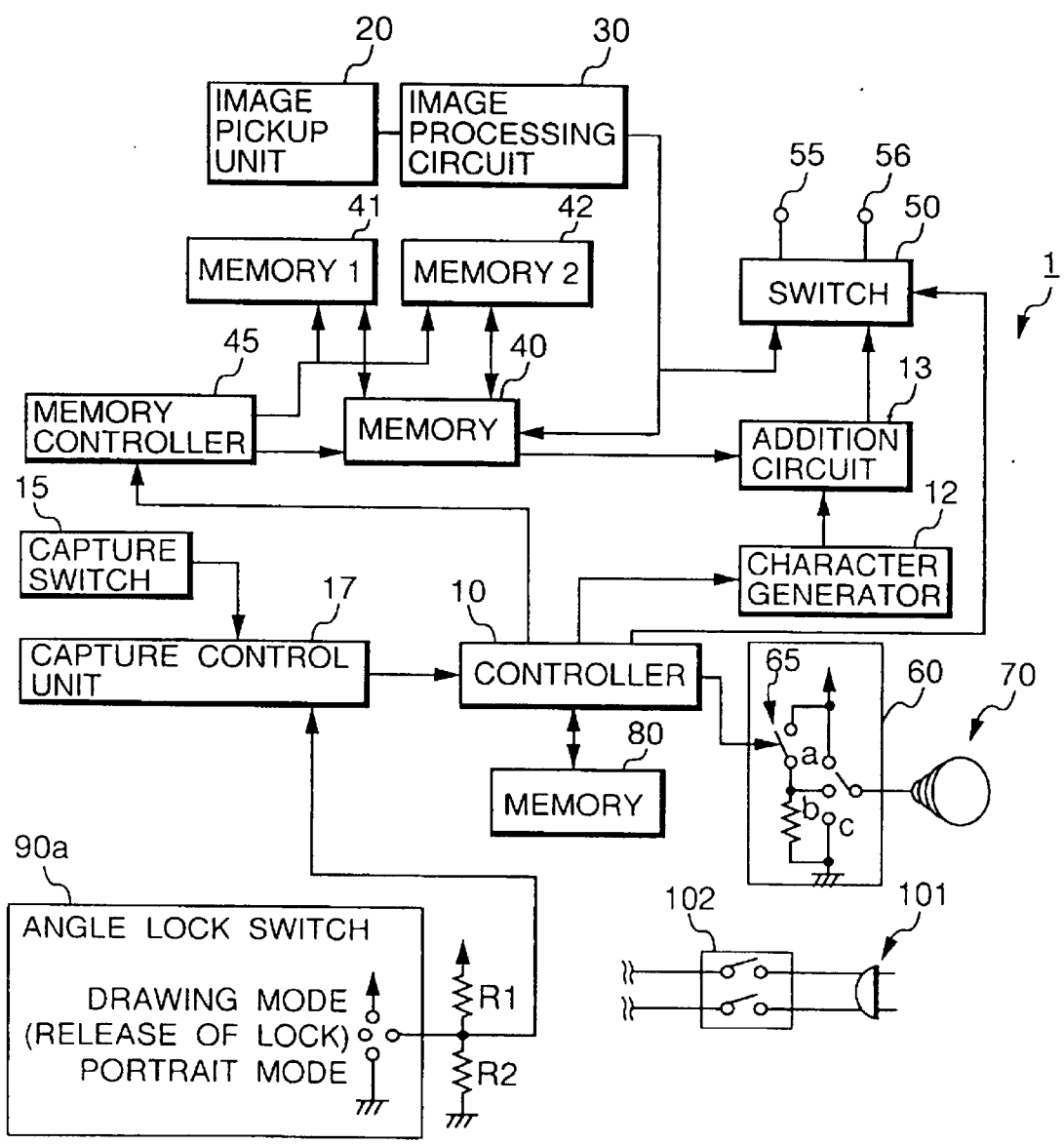
FIG. 1 is a block diagram of an image input apparatus of an image input system according to an embodiment of the invention.
Figure 2:
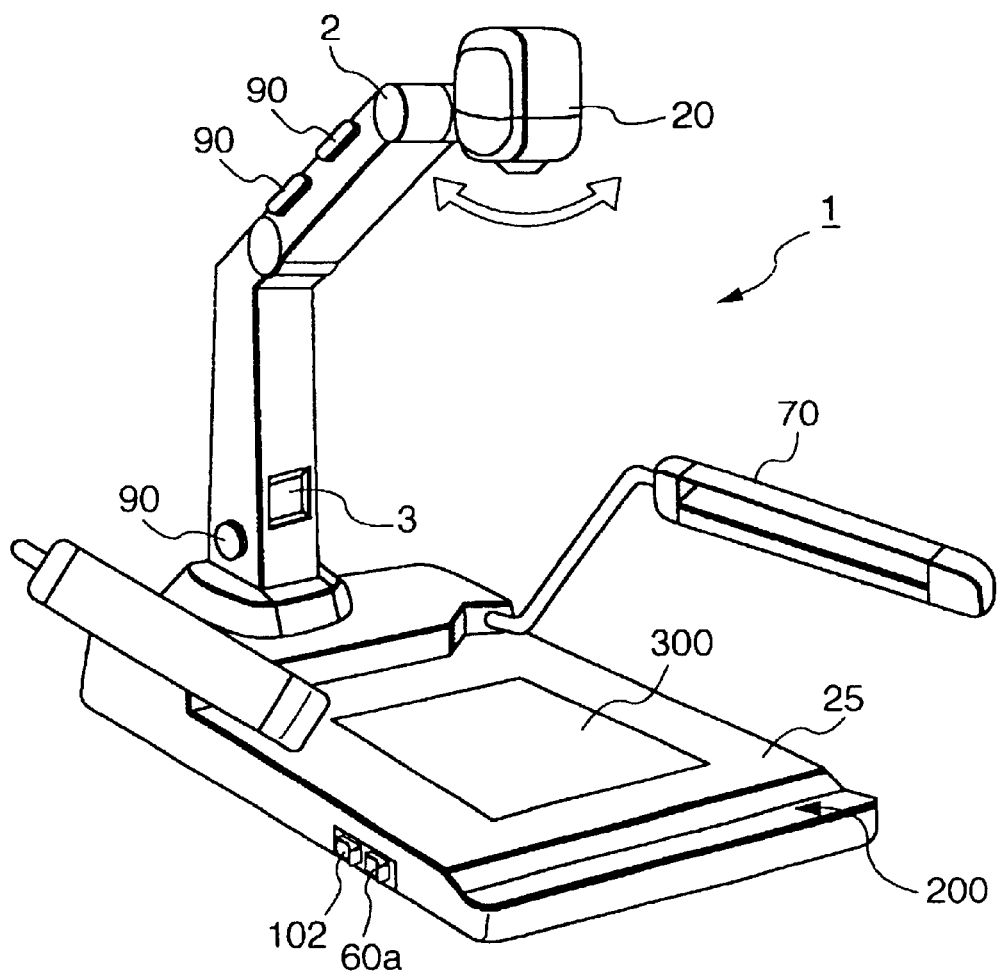
FIG. 2 is a perspective view of the image input apparatus shown in FIG. 1.

FIG. 1 is a block diagram of an image input apparatus of the image input system according to the embodiment of the invention. FIG. 2 is a perspective view of the image input apparatus.

An image input apparatus 1 has an image pickup unit 20 for picking up an image of a document 300 placed on an original support (base) 25. An image signal of the document 300 photoelectrically converted by the image pickup unit 20 is supplied to an image processing circuit 30 which processes the image signal to control the amplitude, white balance, and frequency characteristics. The image signal outputted from the image processing circuit 30 is temporarily stored in an image memory 40 in response to a trigger signal from a controller 10 via a memory controller 45, which trigger signal is outputted when a drawing side (LOW) of an angle lock switch 90a for detecting a change in the image pickup direction is changed to a portrait side (HIGH). The angle lock switch 90a outputs a signal to a capture control unit 17, the signal changing between HIGH and LOW each time the image pickup direction of the image pickup unit 20 is turned to the portrait side or drawing side.

The image signal temporarily stored in the image memory 40 is stored in an image memory 41 in the drawing mode, and stored in an image memory 42 in the portrait mode. In response to a signal from the controller 10, the memory controller 45 operates to store the image signal in the image memory 40 either into the image memory 41 or 42, and the image signal stored in the image memory 41 or 42 into the image memory 40.

In response to a depression of a capture switch 15 and a signal outputted therefrom, the capture control unit 17 issues a command to the controller 10 to store the image signal from the image processing circuit 30 in the image memory 40, so that the object image picked up by the image pickup unit 20 is temporarily stored in the image memory 40.

The image input apparatus 1 has a character generator 12 which outputs a character signal in response to a control signal from the controller 10. A character signal from the character generator 12 and an image signal from the image memory 40 are added together by an addition circuit 13, the added signal being outputted from an external output terminal 55 for an external monitor 5 (refer to FIGS. 4A, 4B, 5A to 5D) and/or an internal monitor output terminal 56 for an internal monitor 3 (refer to FIG. 2). The external output terminal 55 and internal monitor output terminal 56 are connected via a switch 50 to the addition circuit 13 and image processing circuit 30. In response to a signal from the controller 10, the switch 50 selects an input signal either from the addition circuit 13 or from the image processing circuit 30, and outputs the selected signal either to the external output terminal 55 or the internal monitor output terminal 56, or to both of them. With the internal monitor 3, an operator can check conveniently the display contents of the external monitor 5 without directly looking at the external monitor 5.

The image input apparatus 1 has a light 70 for illuminating the original support 25 and the document 300 placed thereon. Power is supplied to this light 70 via a switch circuit 60 operated in response to an external switch 60a. Depending upon a selected contact, the switch circuit 60 operates to always turn the light 70 (contact a) on, to automatically turn it on only during the drawing mode (contact b), or to always turn it off (contact c). The switch circuit 60 has another switch 65 which is turned on or off in response to a control signal from the controller 10. With this switch 65 being turned on, the contact b becomes active.

The controller 10 is connected to a memory 80 which stores various setting constants of the image input apparatus 1. The image input apparatus 1 is also provided with a power source plug 101 and a power switch 102.

Figure 3:
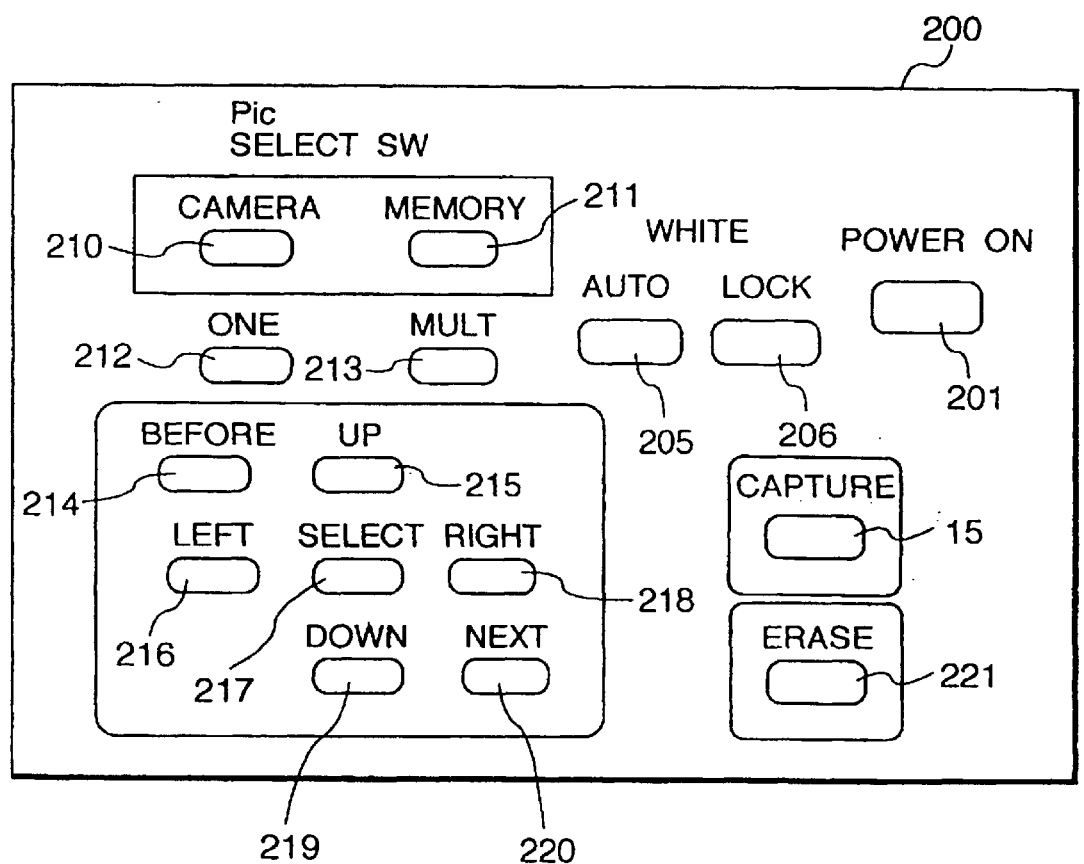
FIG. 3 is a diagram showing an operation panel of the image input apparatus.

Next, an operation panel 200 (FIG. 2) will be described with reference to FIG. 3.

The operation panel 200 has display LEDs including LEDs 201, 205, and 206. The LED 201 indicates a power-on upon turning on the power switch 102. The LED 205 indicates an automatic trace mode of white balance or automatic white balance mode. The LED 206 indicates a white balance fixed mode.

The operation panel 200 has image selection switches including switches 210 and 211. The switch 210 is used for selecting an image signal outputted from the image pickup unit 20 and has an LED which turns on when the switch selects it. The switch 211 is used for selecting an image signal stored in the image memory 40 (image memories 41 and 42) and has an LED which turns on when the switch selects it.

The operation panel 200 has other image display pattern selection switches including switches 212 and 213. The switch 212 is used for selecting a display of a single image, and has an LED which turns on when the switch selects it. The switch 213 is used for selecting a display of an image group of multi-image represented by an image signal containing a predetermined number of images.

The operation panel 200 has other multi-image group selection switches including switches 214 and 220. The switch 214 is used for selecting a display of a predetermined number of images (image group) stored before the presently displayed image group of multi-image, and has an LED which turns on when the switch selects it. The switch 220 is used for selecting a display of a predetermined image group stored after the presently displayed image group of multi-image, and has an LED which turns on when the switch selects it.

The operation panel 200 also has switches for selecting one image from the image group, including UP, LEFT, RIGHT, and DOWN switches. The UP switch 215 is used for selecting an image in the image group in the up-direction from the image presently indicated by a cursor. The LEFT switch 216 is used for selecting an image in the image group in the left-direction from the image presently indicated by a cursor. The RIGHT switch 218 is used for selecting an image in the image group in the right-direction from the image presently indicated by a cursor. The DOWN switch 219 is used for selecting an image in the image group in the down-direction from the image presently indicated by a cursor. An image selected by the cursor moved by these switches 215, 216, 218, and 219 can be displayed as a full-screen image by a SELECT switch 217. The full-screen image can be deleted from the monitor screen by an ERASE switch 221. The operation panel 200 also has the capture switch 15 described above.

Next, the operation of the image input system will be described. An operator inserts the power source plug 101 (FIG. 1) into an unrepresented receptacle of a commercial power source and turns the power switch 102 on, in order to use the image input apparatus 1 as a drawing camera for picking up an image of an object placed on the original support 25.

The conditions before the power is turned on are as follows. The image pickup unit 20 is fixed at a predetermined position before the power switch 102 is turned on in order to use it at first as a drawing camera, because the rotation of a rotary shaft unit 2 is locked by an angle lock button 90. Therefore, the angle lock switch 90a is in a conductive state. The contact b of the switch 60 is also in a conductive state.

When the power switch 102 is turned on and the controller 10 is activated, the controller 10 judges from an H level voltage supplied from the angle lock switch 90a that the angle lock switch 90a is in the drawing mode and is in the lock state. The controller 10 reads white balance control data of the drawing mode previously stored in the memory 80, and supplies it to the image processing circuit 30 in order to set the white balance to the drawing mode. In this case, a white balance lock signal of an H level is supplied to the LED 206 to turn it on for an indication that the white balance is being locked. Since the angle lock switch 90a outputs the H level, the controller 10 closes the switch 65 so that the light 70 is powered and turned on.

Under the above conditions, an operator can speak while picking up the image of the document 300, and a necessary document is stored in the image memory 40 by depressing the capture switch 15. A trigger signal inputted from the capture switch 15 is supplied to the capture control unit 17. In response to this trigger signal, the capture control unit 17 supplies the controller 10 with a signal instructing to temporarily store the image signal in the image memory 40 as the drawing image signal. In response to this signal, the controller 10 operates to temporarily store the image signal outputted from the image processing circuit 30 in the memory 40. Since an output from the angle lock switch 90a indicates that the image pickup unit 20 is in the drawing mode, the image signal is stored in the image memory 41 for storing the image during the drawing mode.

It is assumed here that the operator stops picking up the image of the document 300 and manipulates the angle lock switch 90 in order to change the angle of the image pickup unit 20 to use it as a portrait camera and receive questions from participants. In this state since the angle lock switch 90*a* is released and enters in an open state, an output signal from the angle lock signal 90*a* changes to a preset voltage value determined by resistors R1 and R2. The capture control unit 17 detects from this change in the output signal of the angle lock switch 90*a* that the image pickup unit 20 has been released from the drawing mode. The capture control unit 17 then outputs a signal indicating this change to the controller 10. Upon reception of the signal indicating a release from the drawing mode, the controller 10 supplies a signal to the memory controller 45 in order for the memory controller 45 to operate to temporarily store the output signal from the image processing circuit 30 in the image memory 40. The memory controller 45 therefore temporarily stores the output signal from the image processing circuit 30 in the image memory 40. While the drawing mode transits to the portrait mode, an image stored in the image memory 40 is outputted via the addition circuit 13 and switch 50 to the external monitor 5. Therefore it becomes possible to inhibit a display of the image while the image pickup unit 20 moves. Thereafter, as the operator fixes the angle lock button 90 with the image pickup unit 20 being directed to a questioner, the output signal of the angle lock switch 90*a* changes to a Low level so that the portrait mode can be detected. Upon this detection of the portrait mode, the controller 10 switches the outputs of the output terminals 55 and 56 from an output of the memory 40 to the output of the image pickup unit 20. The controller 10 also outputs a signal to the switch circuit 60 to release the switch 65 and turn off the light 70. The controller 10 also releases the white balance lock to enter a white balance state. At this time, the LED 206 indicating the white balance lock is turned off and the LED 205 indicating a white balance mode is turned on.

If a questioner asks about data displayed immediately before transition from the portrait mode, the operator selects the memory image output selection switch 211 so that the controller 10 changes the contact state of the switch 50 to output signal from the addition circuit 13. In this case, since the signal to be inputted to the addition circuit 13 is a signal stored when the angle lock switch 90*a* was released immediately before the image pickup unit 20 was changed to the portrait mode, i.e., the image of data last discussed, the operator merely selects the memory image output selection switch 211.

If a questioner asks about data discussed previously, the operator selects the multi-image selection switch 213. When an image group of multi-image is selected, the controller 10 reads in a skip-manner images, for example, nine images sequentially stored in the memory 41, forms a single image group of multi-image on the memory 40, and outputs it to the addition circuit 13. The controller 10 also operates to output character signals of the image serial numbers of images of multi-image from the character generator 12. The addition circuit 13 adds the character signals to the multi-image signal and outputs the result to the switch 50. Under the control of the controller 10, the switch 50 selects a signal from the addition circuit 13 and outputs it to display the multi-image of data presented during discussion.

Display examples will be described with reference to FIGS. 4A, 4B, and 5A to 5D.

Figure 4A:
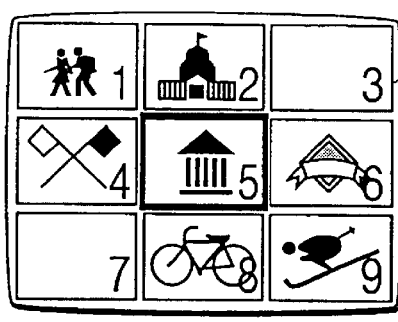
FIGS. 4A and 4B are diagrams showing examples of images displayed on a monitor.
Figure 4B:
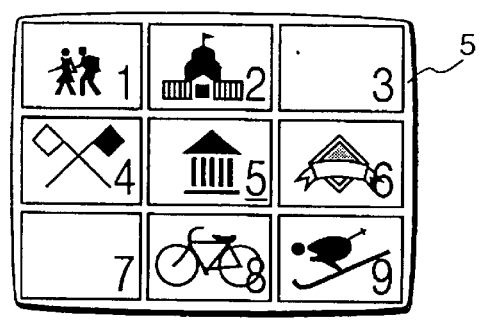

FIGS. 4A and 4B show multi-image displays on the monitor screen. As seen from FIGS. 4A and 4B, each image group of multi-image has nine images and the image No. 5 is being selected. In FIG. 4A the image No. 5 is discriminated by using a bold frame, and in FIG. 4B it is discriminated by using a bar under the numerical character 5.

Figure 5A:
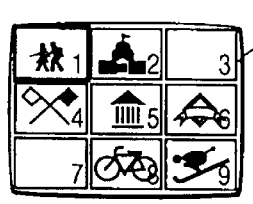
FIGS. 5A to 5D are diagrams showing other examples of images displayed on a monitor.
Figure 5B:
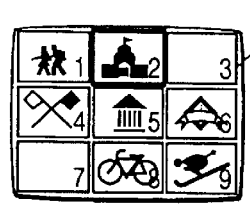
Figure 5C:
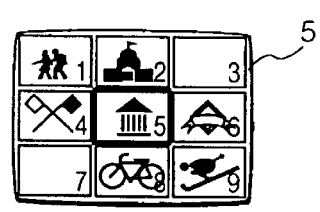
Figure 5D:
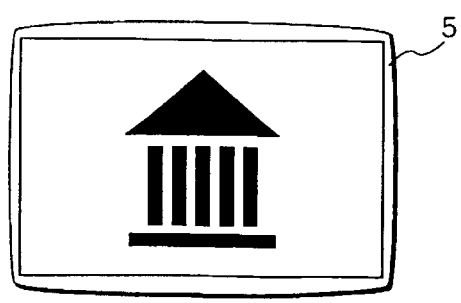

It is possible for the operator (lecturer) to select any one of images which the questioner wishes to ask about and display it again on the full screen of the monitor, in the following manner. A cursor (in this embodiment, a bold frame or bar) is moved to the desired image by using the switches 215, 216, 218, and 219 and the selection switch 217 is depressed. This operation will be detailed with reference to FIGS. 5A to 5D. When an image group of multi-image is selected by the switch 213 (FIG. 3), images with the serial numbers being superimposed are displayed and at the initial state the image No. 1 is being selected (in this example, with a bold frame), as shown in FIG. 5A. When the switch 218 is depressed next, the selected image changes to the image No. 2 as shown in FIG. 5B. When the switch 219 is depressed next, the selected image changes to the image No. 5 as shown in FIG. 5C. When the selection switch 217 is depressed next, the image No. 5 selected as shown in FIG. 5C is displayed on the full screen of the monitor 5.

If there are a number of document sheets used and the desired image is not found in the displayed image group of multi-image, the preceding image group is displayed by using the switch 214 to select the desired image in the manner described above. If characters in the selected image are too small to distinguish, part of the image may be zoomed up. This zoom-up can be achieved by partially enlarging the image stored in the memory. If characters are still small with this zoom-up, then the document 300 is again placed on the original support 25 and zoomed up by using the optical system of the image pickup unit 20.

If the displayed image is to be deleted, the switch 221 is depressed. In this embodiment, although the displayed image only is deleted, the image data stored in the image memory 41 may also be deleted in response to the operation of deleting the displayed image. If an unnecessary image stored in the memory is to be deleted, an image group of multi-image is displayed, the unnecessary image is displayed on the full screen of the monitor, and after the confirmation it is deleted by depressing the switch 221. In this manner, even images picked up under unsatisfactory pickup conditions can be easily deleted.

If the image memory 40 is divided into storage areas for a single image area and a multi-image area, switching between single images and images of multi-image can be performed at high speed by the memory controller 45 which operates in response to a signal from the controller 10 receiving a selection signal from the switch 212 or 213 of the operation panel to selectively output the images stored in these areas.

In the above description, although two memories are used for the drawing and portrait modes, a single image memory capable of storing a plurality of images may be used. In this case, while an image signal is stored, identification data for the image signal is stored in the memory 80 or memory controller 45 so that an image signal of the portrait mode or drawing mode can be discriminated from the identification data. Therefore, only the image signals stored in the drawing modes can be selected to display an image group of multi-image.

As described so far, if the image input apparatus of this embodiment is applied to a system such as a presentation system, data once discussed can be displayed again easily so that discussion with questioners can be smoothly promoted.

The images of questioners can also be stored in a different memory block by using the image pickup unit of the embodiment apparatus as a portrait camera. Therefore, the portrait image is not prevented from being inadvertently displayed during presentation. The portrait images may be used when reports are formed after the presentation.

The advantageous effects of the above embodiment are enumerated as in the following.

First, a plurality of objects such as documents picked up can be stored and an image group of multi-image having a predetermined number of images can be displayed on a monitor. Therefore, data asked about by a questioner during presentation or the like can be easily selected, facilitating the promotion of communications between lectures and questioners.

Second, while an object other than on the original support is being picked up, an image group of objects on the original support picked up previously can be displayed. Therefore, the first advantage can be enhanced more.

Third, since selecting means for selecting one of images of an image group displayed on the display device is provided, the image can be displayed on the full screen of a display unit.

Fourth, controlling means controls to display a signal image of an image group of multi-image selected by the selecting means on the full screen of the display device. Therefore, the contents of document data displayed can be clearly confirmed to help ask an exact question.

Fifth, the controlling means can control to display another image group stored previously in place of a currently displayed image group. Therefore, even if a desired image cannot be found in the displayed image group, other image groups can be sequentially displayed to find the desired image.

Sixth, adding means is provided for adding an identification code to an image stored in storing means. Therefore, an image of desired document data can be designated at once.

The image input apparatus of the embodiment has the original support. Obviously, the invention is also applicable to an image input apparatus without such an original support.

What is claimed is:

1. An image reproducing apparatus capable of outputting an image of an object, picked up by a camera unit; to a display device, comprising:

a storage device to store images of a plurality of objects, together with information of direction of the camera unit, wherein the direction is determined on the basis of the positional relation between the image reproducing apparatus and the camera unit, and includes a first direction and a second direction, and the object to be picked up in the first direction and the object to be picked up in the second direction are different from each other;

a reproducing device to reproduce a plurality of images picked up by the camera unit, to output the plurality of images to the display device; and a reproducing control device to control reproduction by said reproducing device so as to reproduce a group of images picked up by the camera unit, wherein directions of the group of images are the same as one of the first direction and the second direction, among the plurality of images stored in said storage device, in accordance with the information of direction of the camera unit.

2. An apparatus according to claim 1, further comprising a detecting device to detect a direction of the camera and generate the information of direction of the camera.

3. An apparatus according to claim 1, wherein the information of the direction of the camera, which is to be stored in the storage device together with the plurality of images, is information as to a direction where the camera is directed when the respective images to be stored in the storage device are picked up.

4. An image reproducing method of outputting an image of an object, picked up by a camera unit and stored together with information of direction of the camera unit, from an image reproducing apparatus to a display device, comprising the steps of:

storage images of a plurality of objects, together with information of direction of the camera unit in a storage device, wherein the direction is determined on the basis of the positional relation between the image reproducing apparatus and the camera unit, and includes a first direction and a second direction, and the object to be picked up in the first direction and the object to be picked up in the second direction are different from each other;

reproducing a plurality of images picked up by the camera unit in the storage device, to ouput the plurality of images to the display device; and controlling reproduction so as to reproduce a group of images picked up by the camera unit, wherein directions of the group of images are the same as one of the first direction ad the second direction, among the plurality of images stored in the storage device, in accordance with the information of direction of the camera unit.

5. A method according to claim 4, further comprising a detecting step of detecting a direction of the camera and generating the information of direction of the camera.

6. A method according to claim 4, wherein the information of direction of the camera, which is to be stored in the storage device together with the plurality of images, is information as to a direction where the camera is directed when the respective images to be stored in the storage device are picked up.

7. A computer readable medium storing a program for executing a process of outputting an image of an object, picked up by a camera unit and stored together with information of direction of the camera unit, from an image reproducing apparatus to a display device, the program executing the processes of:

storing images of a plurality of objects, together with information of direction of the camera unit in a storage device, wherein the direction is determined on the basis of the position relation between the image reproducing apparatus and the camera unit, and includes a first direction and a second direction, and the object to be picked up in the first direction and the object to be picked up in the second direction are different from each other;

reproducing a plurality of images picked up by the camera unit in the storage device, to output the plurality of images to the display device; and controlling reproduction so as to reproduce a group of images picked up by the camera unit, wherein directions of the group of images are the same as one of the first direction and the second direction, among the plurality of images stored in the storage device, in accordance with the information of direction of the camera unit.

8. A computer readable medium according to claim 7, further comprising a detecting process of detecting a direction of the camera and generating the information of direction of the camera.

9. A computer readable medium according to claim 7, wherein the information of direction of the camera which is to be stored in the storage device together with the plurality of images, is information as to a direction where the camera is directed when the respective images to be stored in the storage device are picked up.

* * * * *

UNITED STATES PATENT AND TRADEMARK OFFICE
CERTIFICATE OF CORRECTION

PATENT NO. : 7,173,628 B1
APPLICATION NO. : 09/580588
DATED : February 6, 2007
INVENTOR(S) : Hisahi Kawai It is certified that error appears in the above-identified patent and that said Letters Patent is hereby corrected as shown below:

COLUMN 7:

Line 7, "multi-image" should read --multi-images--.
Line 11, "lectures" should read --lecturers--.
Line 42, "unit;" should read --unit,--.

COLUMN 8:

Line 27, "ad" should read --and--.

Signed and Sealed this

Fifth Day of August, 2008

JON W. DUDAS
*Director of the United States Patent and Trademark Office*